US000001064H

United States Statutory Invention Registration [19]

[11] Reg. Number: H1064

Wilkey

[43] Published: Jun. 2, 1992

[54] MELT FUNCTIONALIZATION OF POLYMERS

[75] Inventor: John D. Wilkey, Houston, Tex.

[73] Assignee: Shell Oil Company, Houston, Tex.

[21] Appl. No.: 524,413

[22] Filed: May 16, 1990

[51] Int. Cl.[5] ..... C08F 293/00; C08C 19/22

[52] U.S. Cl. ..... 525/314; 525/376

[58] Field of Search ..... 525/376

[56] References Cited

U.S. PATENT DOCUMENTS

| | | | |
|---|---|---|---|
| 3,369,012 | 2/1968 | Lundberg | 260/94.7 |
| 3,376,278 | 4/1968 | Morgan et al. | 260/93.7 |
| 3,676,409 | 7/1972 | Duck et al. | 260/80.78 |
| 3,933,768 | 1/1976 | Yukuta et al. | 260/80.78 |
| 4,276,393 | 6/1981 | Falk | 525/233 |
| 4,309,453 | 1/1982 | Reiner et al. | 427/54.1 |
| 4,424,323 | 1/1984 | Lohr et al. | 526/180 |
| 4,536,545 | 8/1985 | Olener et al. | 525/75 |
| 4,579,905 | 4/1986 | Krabbenhoft | 525/63 |
| 4,605,704 | 8/1986 | Eastman et al. | 525/193 |
| 4,661,549 | 4/1987 | Walker | 524/397 |
| 4,709,085 | 11/1987 | Nugent et al. | 560/124 |
| 4,806,581 | 2/1989 | Walker | 524/178 |
| 4,921,914 | 5/1990 | Udding | 525/184 |

OTHER PUBLICATIONS

Aglietto, et al., Polymer, 30, pp. 1133–1136 (1980).

"Preparation and Reactions of Carbamate-Modified Polyethylene", R. R. Gallucci, Journal of Appl. Pol. Sci., vol. 26, 249–260 (1981).

Polyolefin Functionalization By Carbene Insertion for Polymer Blends, M. Aglietto, R. Alterio, R. Bertani, F. Galleschi and G. Ruggeri, Polymer, 1989, vol. 30, Jun.

*Primary Examiner*—Robert L. Stoll

*Assistant Examiner*—Philip Tucker

[57] ABSTRACT

A process is provided to graft functional moieties to base polymers by contacting the base polymer with functional group containing diazo compounds. The preferred function group containing diazo is ethyl diazoacetate. The base polymer is a copolymer or polymer having monomer units of alpha olefins, conjugated diolefins, vinyl aromatics, or hydrogenated conjugated diolefins. The process is performed in a melt and results in low levels of scissioning, coupling and degradation.

35 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MELT FUNCTIONALIZATION OF POLYMERS

FIELD OF THE INVENTION

This invention relates to a process to prepare a polymer which comprises polar functionality, and to the polymer prepared by this process.

BACKGROUND OF THE INVENTION

This invention provides a process to produce a polar group containing polymer wherein the polar group containing polymer has a narrow molecular weight distribution.

Polar group containing polymers may be prepared by copolymerizing monomers such as methacrylates and nitriles, with alpha olefin monomers, but such copolymers are generally prepared by free radical polymerization. Free radical polymerization is subject to premature termination by various mechanisms and therefore results in a very wide molecular weight distribution. A polymer with a wide molecular weight distribution is undesirable for many end uses because the low molecular weight portions impart undesirable properties of low molecular weight polymers, such as low glass transition temperatures, low tensile strengths, and low melt flow temperatures, while the high molecular weight portion imparts many undesirable properties of high molecular weight polymers, such as high melt viscosity. Further, free radical mechanisms cannot be utilized to produce block copolymers. Block copolymers of styrene and conjugated diolefins are useful in many applications due to their ability to phase separate into domains of each type of block. The benefits of phase separatable polymeric blocks within the polymer molecules cannot be realized with free radical polymerized polymers. As opposed to free radical polymerization, anionic polymerization can result in polymers with very narrow molecular weight distributions and sequential addition of monomers can result in distinct polymeric blocks. Unfortunately, polar monomers are generally protic, and terminate anionic polymerization. Polar monomers can therefore generally not be copolymerized with other monomers to form polar group containing polymers with narrow molecular weight distributions.

Polymers containing polar functional groups, including block copolymers, can be produced by extruder grafting alpha-beta unsaturated polar group containing monomers to base polymers. Maleic anhydride and maleic acid are the most commonly grafted monomers. A process utilizing a free radical initiator is typically utilized, such as the process disclosed in U.S. Pat. No. 4,657,971. This grafting is easily accomplished in an extruder. A polymer with a narrow molecular weight distribution may be used as the base material, but the free radical grafting mechanism results in considerable scissioning and coupling of the base polymer. This results in a polar group containing polymer which has about 20 weight percent of the polymer either degraded or coupled.

When a styrene-conjugated diolefin block copolymer is extruder grafted with an ethylenically unsaturated monomer, the grafting will occur predominantly within the conjugated diolefin block. In many applications, it is desirable to have at least a portion of the functionality grafted within the styrene blocks.

Processes to graft polar functional groups to polystyrene blocks of block copolymers of styrene and conjugated diolefins are also known, but are also replete with shortcomings. One of these processes involves reacting the polymer with a metal alkyl, and then replacing the metal alkyl with an electrophile such as carbon dioxide, ethylene oxide, aldehydes, ketones, carboxylic acids, salts, epoxides and isocyanates. Such a process is disclosed in U.S. Pat. No. 4,797,447. This process is carried out in a solution. A process which can be accomplished in a melt phase is desirable due to the expense and process steps involved in dissolving the polymer and then removing the solvent. Additionally, like free radical grafting, this process results in considerable scissioning, coupling and degradation of the base polymer.

It is therefore an object of this invention to provide a process to produce a polar group containing polymer wherein the polar group containing polymer is not excessively coupled or degraded and wherein the process is carried out in a melt. In another aspect, it is an object to provide the product of this process.

SUMMARY OF THE INVENTION

The objects of this invention are achieved by a process to produce a functionalized polymer, the process comprising the steps of: providing a melt of a base polymer, the base polymer comprising polymerized monomers selected from the group consisting of alpha olefins, vinyl aromatics, conjugated diolefins, and hydrogenated conjugated diolefins; contacting the melt of the base polymer with a functional group containing diazo compound; and recovering a functionalized polymer. The functionalization according to this invention can be accomplished with less scissioning, coupling and degradation of the base polymer than alternative processes, and can be performed in a melt phase with reaction times which are sufficiently fast for the reaction to be performed in an extruder. The product of this process has excellent tensile strength and a low modulus, excellent oil resistance, excellent solvent resistance and good high temperature properties.

In a preferred embodiment, the base polymer is a hydrogenated polymer comprising, before hydrogenation, at least one block, which is predominantly conjugated diolefin monomer units and at least one block which is predominantly monovinyl aromatic monomer units. This process will distribute polar functionality to both monovinyl aromatic blocks and conjugated diolefin blocks.

In another preferred embodiment, ester functionality is initially grafted to the base polymer by the process of this invention. This ester functionality is optionally replaced with acid or salt functionality which increases the strength of the polar bonds created between the grafted groups. Ester functionality may be partially or totally replaced with acid groups by hydrolysis, and acid functionality can then be replaced with salt functionality by neutralization with a base.

DETAILED DESCRIPTION OF THE INVENTION

A wide variety of base polymers may be functionalized by the process of this invention. Carbenes, which are the disassociation product of diazo compounds, may add across an ethylenic or an aromatic double bond, and may add by an insertion mechanism to a saturated polymer chain. The presence of double bonds may therefore enhance the graftability of diazo compounds, but is not necessary to have carbon-carbon double bonds within the polymer. Suitable polymers include polymers containing monomer units of alpha olefins, conjugated diolefins, vinyl aromatics and hydrogenated conjugated diolefins, combinations of these and combinations of these with other monomer units.

The polymers to be functionalized may be polymerized by any known process, including anionic, cationic and free radical processes. A major advantage of the present invention is the low level of scissioning and coupling. Therefore, anionically polymerized polymers are the preferred polymers because anionically polymerized polymers generally have a narrower initial molecular weight distribution, and the resulting functionalized polymer therefore has a narrower molecular weight distribution.

The preferred polymers are also solid at room temperature, which permits the process of the present invention to be carried out in an extruder. To be solids at room temperature, number average molecular weights of polymers must exceed about 5000. More preferably, the number average molecular weight of the polymer exceeds about 15,000. The minimum molecular weight for a polymer to be extrudable varies considerably with the type and structure of the polymer.

Elastomeric polymers which comprise alpha olefins, such as atactic polypropylene, polyisobutene, polybutene, EP rubbers, and EPDM can be functionalized by the present invention in order to introduce polar crosslinks. Salt functionality, and particular polyvalent metal salt functionality, acts as polar crosslinks between polymer molecules and results in a composition which has the excellent elastomeric properties of vulcanized rubbers, but also the reprocessability of a thermoplastic. Non-elastomeric alpha olefin polymers such as HDPE, LDPE, LLDPE and polypropylene are often functionalized to introduce sites for reactions with dyes, to increase compatibility with polar thermoplastics and to improve adhesion to polar substrates. These polymers can be functionalized by the process of this invention in order to achieve these objectives.

Polyisobutenes, ethylene-propylene copolymers, EPD, EPDM, hydrogenated isoprene and hydrogenated isoprene-styrene diblock polymers are functionalized with nitrogen containing compounds or carboxylic acid and utilized as viscosity index improvers for lubricating oils and greases. These polymers may also contribute dispersant and detergent properties, depending on the functional group incorporated. The effect of these polymers on viscosity increases dramatically with molecular weight, and the shear stability decreases with increasing molecular weight. Narrow molecular weight distribution is therefore very desirable in these applications in order for the additive to have a good thickening effect and yet not lose this thickening effect in service due to the larger polymer molecules shearing. The present invention is very favorably utilized to incorporate functionality onto any polymer which is useful as a lubricating oil additive due to the low amount of scissioning and coupling resulting from functionalization by this method.

Polymers containing styrene monomer units may be functionalized according to the present invention to produce polymers having higher glass transition temperatures, greater tensile strengths, greater compatibility with polar thermoplastics, retention of properties to higher temperatures, and greater adhesion to polar substrates.

Particularly preferred polymers for functionalization by the process of this invention are block copolymers comprising at least one block comprising predominantly vinyl aromatics and at least one block comprising predominantly conjugated diolefins. These polymers are preferably hydrogenated to remove more than 80 percent and more preferably more than 95 percent of initial ethylenic unsaturation. Hydrogenation of the ethylenic unsaturation improves thermal, oxidative and u.v. stability. The conjugated diolefin and vinyl aromatic blocks of these polymers are incompatible with each other, and form separate domains. The vinyl aromatic domains are hard, and serve to tie together the polymer molecules. The conjugated diolefin domains are soft and rubbery, and can have a glass transition temperature below −30° C. When the block copolymer molecules have two or more vinyl aromatic blocks, the vinyl aromatic domains anchor the ends of intervening conjugated diolefin blocks and impart excellent elastomeric properties to the copolymer, when the vinyl aromatic content is less than about 60 weight percent of the polymer. The blocks of the particularly preferred block copolymer may themselves be copolymer blocks of a major component, and a minor component in a random or tapered fashion, so long as the blocks differ in solubility parameter enough to form phase-separated domains. Generally, a difference in solubility parameter of about 2 is sufficient for phase separated domains to exist.

The preferred vinyl aromatic is styrene. The preferred conjugated diolefin is either butadiene, isoprene or a combination of isoprene and butadiene.

The block copolymer may be produced by any block polymerization or copolymerization procedure including sequential addition of monomers incremental addition of monomers and coupling as illustrated in, for example, U.S. Pat. Nos. 3,251,905; 3,390,207; 3,598,887 and 4,219,627 which are incorporated herein by reference. Tapered copolymer blocks can be incorporated in the multiblock copolymer by copolymerizing a mixture of conjugated diene and vinyl aromatic monomers utilizing the difference in their copolymerization reactivity rates. Various patents describe the preparation of multiblock copolymers containing tapered copolymer blocks including U.S. Pat. Nos. 3,251,905; 3,265,765; 3,639,521 and 4,208,356 which are incorporated herein by reference. Additionally symmetric and asymmetric radial and star block copolymers are useful in this invention, and are described in, for example, U.S. Pat. Nos. 3,231,635; 3,265,765; 3,322,856; 4,391,949; and 4,444,953; which are incorporated herein by reference.

It should be observed that the above described polymers and copolymers may, if desired, be readily prepared by the methods set forth above. Many of these polymers and copolymers are commercially available and it is usually preferred to employ the commercially available polymer to reduce the number of processing steps involved in the overall process.

Hydrogenation of conjugated diolefin containing polymers and copolymers may be carried out by a variety of well established processes including hydrogenation in the presence of such catalysts as Raney Nickel, noble metals such as platinum, palladium and the like and soluble transition metal catalysts. Suitable hydrogenation processes which can be used include ones wherein the polymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986 and 4,226,952, which are incorporated herein by reference.

When block copolymers having two or more blocks of vinyl aromatics separated by one or more blocks of conjugated diolefins are functionalized by contact with the diazo compound of this invention the functionality is distributed among both vinyl aromatic blocks and conjugated diolefin blocks. If the functionality within the vinyl aromatic blocks is converted to acid and/or salt functionality, the functionality will provide polar bonds between vinyl aromatic blocks. This increases the glass transition temperature of the vinyl aromatic domains. Higher vinyl aromatic domain glass transition temperatures result in a higher maximum service temperature for the polymer. High temperature properties, such as 100° C. compression set, are also generally improved. The polar bonds also result in increased tensile strength and solvent resistance for non-polar solvents.

The diazo compound which may be utilized to functionalize polymers according to this invention must contain a diazo group and a functional group which either is a polar functional group, or is capable of being converted to a polar functional group with known chemistry. The diazo compound is one of the general formula:

$$R_1R_2C{=}N^{-}{=}N^{-}$$

Wherein $R_1$ is selected from the group consisting of hydrogen, an alkyl radical and a functional group containing radical; and $R_2$ is a functional group containing radical.

Functional groups include:

carbonyl (including aldehyde, ketone, ester, amide and quinone);
phosphoryl (including phosphine oxide, phosphinate, and phosphonate);
sulfonyl (including sulfinyl and sulfonyl);
halogen;
alkenyl;
alkynyl;
aryl;
nitro;
nitrile (including cyano);
silyl; and
imine.

Because diazo compounds react with carboxylic acid functionality to form esters, carboxylic acid groups cannot be incorporated directly. But esters can be present on relatively stable diazo compounds and these esters are conveniently converted to carboxylic acid or salt functionality after the esters are grafted to the base polymer. Diazo compounds which contain ester functionality are therefore preferred. Alkyl diazoacetates, such as ethyl diazoacetate, are most preferred.

The amount of diazo compound which is contacted with the base polymer can vary considerably, but to result in a useful amount of functional units grafted to the base polymer, it is preferred that in the range of from about one to about 200 moles of diazo compound per mole of base polymer be contacted with the base polymer. More preferably, the amount of diazo contacted with the base polymer is in the range of from about five to about 100 moles of diazo compound per mole of base polymer.

The diazo compounds react with the polymers by first forming a carbene and releasing $N_2$. Preferred diazo compounds form a carbene with the diazo compound having a half life of less than about 10 minutes at a temperature of less than about 260° C. in order for melt phase reactions with polymers to proceed rapidly. More preferably the half life of the diazo compound is less then about 5 minutes at a temperature which is acceptable for melt processing the polymer to be functionalized. Acceptable melt processing temperatures typically are between about 150° to about 260° C.

The diazo compounds may be mixed with the melt of the polymer of this invention in an extruder, sigma blade mixer, Banbury mill, Brabender, and the like. Extruders are preferred due to the rapid high shear mixing imparted to the polymer melt. Extender oils, processing oils, or other processing aids may also be present, but because they provide alternative reaction sites for the diazo compounds, the melt is preferably mostly base polymers (greater than about 50 percent by weight).

The time period for the contacting of the base polymer and the diazo compound is preferably between about 5 seconds and about 10 minutes. A contact time within this range is sufficient for the reaction to take place, but is sufficiently brief so excessive degradation of the base polymer does not occur.

The dissociation reaction of diazo compounds results in by-product nitrogen which is conveniently released by venting from the polymer melt. When the process is accomplished in an extruder, a devolatilization port is therefore preferred. The diazo compounds form dimers after releasing nitrogen. The formation of dimers can be minimized by adding the diazo compounds gradually, in steps or diluted in a solvent. The dimers may be left in the polymer composition, or could be removed by, for example, dissolving and precipitation of the grafted polymer or vaporization of the dimers from the polymer melt.

The polymers with polar functional groups grafted to them may be useful products in themselves, but can also be converted to other functional types by known chemistry. When ester functionality is grafted to polymers by contacting the polymer with a diazo compound, the grafted ester groups may be further reacted with ammonia or amines to form amides. The amide functionality may be useful or may be further reacted with dicarboxylic acids to crosslink or graft other polymers or oligomers to the base polymer. Ester functionality could also be reduced to alcohols by reduction with lithium aluminum hydride and similarly, amide functionality can be reduced to amine functionality.

The process of this invention reduces the main gel permeation chromotography ("GPC") peak of the base polymer by less than 15 percent by weight and preferably by less than 10 percent by weight. This low level of loss of GPC main peak is possible because the grafting mechanism is not a free radical method. This permits a functionalized polymer to be produced which has a narrow molecular weight distribution.

Polymers may be grafted with functional groups according to this invention with less scissioning, coupling and degradation of the base polymer. The process can be performed in a melt phase, which is more economical than solvent based operations. When the base polymer is a block copolymer containing both aromatic blocks and aliphatic hydrocarbon blocks, this process also distributes grafted moieties among both aromatic and aliphatic hydrocarbon segments of copolymers.

EXAMPLE 1

In this example, ester functionality is grafted to a styrene-hydrogenated butadiene-styrene block copolymer. The block copolymer is a 50,000 number average molecular weight copolymer with 29% by weight styrene in about equally sized endblocks. The copolymer was selectively hydrogenated, hydrogenating more than 99% of the initial ethylenic unsaturation with more than 98% of the initial aromatic unsaturation remaining. The copolymer was heated to 220° C. in a 40 gm capacity Brabender mixer, and then 2.4 parts by weight of ethyl diazoacetate ("EDA") based on 100 parts by weight of the polymer was added. The EDA was added as a solution in methylene chloride. The temperature was maintained at about 220° C. while mixing at 60 RPM for about 5 minutes. The copolymer was then cooled, dissolved in tetrahydrofuran ("THF") and precipitated into isopropyl alcohol ("IPA"). The presence of ester functionality was determined by new peaks at 1710 and 1740 cm in a thin-film IR spectrum. A $^1$H-NMR spectrum in chloroform-d indicated new peaks at 4.1 and 4.3 ppm which confirm the presence of the ester group. Integration of the new NMR peak and the aromatic polymer resonance indicated the functionalization was approximately 25 percent complete based on the initial charge of EDA. This represents level of functionalization of about 0.42 percent by weight as —CH-$CO_2C_2H_5$ based on total polymer.

The degradation, scissioning and coupling of the functionalized polymer was determined as the difference between the GPC main peaks of the functionalized and the base polymer. This is referred to as the loss in main peak, and was determined to be about 2.2 percent by weight. This loss in main peak is less than the loss in main peak incured by prior art melt grafting processes.

This example demonstrates the feasibility of melt grafting polar functional groups to block copolymers using diazo compounds as the grafting agent.

EXAMPLE 2

A sample of polybutadiene having a number average molecular weight of about 32,000 was prepared by anionically polymerizing butadiene using butyllithium as an initiator and terminating the polymerization using methanol. The polybutadiene sample was then hydrogenated according to the hydrogenation method used in Example 1, and precipitated into IPA. The hydrogenated polymer had a residual unsaturation of less than 1% of initial unsaturation. The polymer crumb was then melted in a 40 gm capacity Brabender mixing head at 200° C. About 5.0 parts by weight of EDA was then added, based on 100 parts by weight of initial polymer. The EDA was added as a solution in methylene chloride. The polymer melt was mixed in the Brabender at 60 RPM for about 5 minutes. The polymer melt was then cooled, dissolved in THF and precipitated into IPA. The recovered polymer had a thin film IR absorption at 1740 $cm^{-1}$ and a $^1$H-NMR resonance at 4.1 ppm, both indicating the presence of ester functionality. Integration of the NMR ester methylene resonance and the aliphatic polymer resonance indicates the functionalization reaction was about 12% efficient, based on the initial charge of EDA. This represents about 0.46 percent weight functionalization as —$CHCO_2C_2H_5$ based on the total functionalized polymer.

The degradation, scissioning and coupling of the functionalized polymer was determined as the difference between the GPC main peaks of the functionalized and the base polymer. This is referred to as the loss in main peak, and was too small to be determined by this method, or approximately zero. This loss in main peak is much less than the loss in main peak incured by prior art melt grafting processes.

This example demonstrates the feasibility of melt grafting polar functional groups to hydrogenated conjugated diolefin polymers. This example also demonstrates that the level of scissioning, coupling and degradation is low when grafting functionality to hydrogenated conjugated diolefin polymers by the process of this invention.

EXAMPLE 3

Polystyrene having a number average molecular weight of about 6900 was melted in a 40 gm capacity Brabender mixer at 200° C. About 7.5 parts by weight, based on 100 parts by weight of polystyrene, of EDA was then added as a solution in methylene chloride. The polymer melt was mixed at about 60 RPM for about 5 minutes while being held at 200° C. The polymer melt was then cooled, dissolved in THF, precipitated into IPA, and oven-dried under a vacuum. The thin-film IR spectrum of the recovered polymer had an absorption at 1707 $cm^{-1}$ which is indicative of alpha-beta unsaturated ester functionality. This absorption was not present in the thin-film IR spectrum of the unmodified polymer. The $^1$H-NMR spectrum of the recovered polymer has a new resonance at 4.3 ppm which is also indicative of ester functionality. Integration of the methylene and aromatic resonances of the recovered polymer indicate that about 16 percent of the initial EDA grafted to the polystyrene. This represents about 0.93 percent by weight of the functionalized polymer as —CH-$CO_2C_2H_5$.

The GPC main peak of the functionalized polymer of this example was essentially unchanged from the base polymer, indicating negligible degradation of the base polymer as a result of the grafting process.

This example demonstrates the feasibility of grafting polar functionality units to polymers of monovinyl aromatics using diazo compounds. Further, this example demonstrates that the level of scissioning, coupling and degradation is low when grafting functionality to polystyrene by the process of this invention.

EXAMPLE 4

The base copolymer of Example 1 was extruder grafted with EDA at four ratios of EDA to copolymer. The extruder was a Berstorff ZSK 25 extruder, which is a 25 mm co-rotating intermeshing twin screw extruder with an L/D of 23. The extruder has five sections which are independently temperature controlled. The extruder was operated at 300 rpm and the feed rate of polymer to the extruder was from about 6 to about 9 kg/hr. The residence time of the copolymer in the extruder was about one minute. The extruder temperature was varied from 160° C. in the feed compression zone, to 175° C. at the EDA injection point, to 180° C. at the reaction and devolatilization port, to 240° C. at the die. The residence time from the EDA injection port to the devolatilization zone is about 10 seconds. The EDA was injected containing 2 weight percent, based on the EDA, of Kaydol 371 oil to aid in injection pump lubrication.

Four samples of ester functionalized copolymer were prepared at varying rates of copolymer feed and EDA feed. Even at the 180° C. devolatilization port temperature, a portion of the ungrafted degradation products of EDA remained with the polymer melt. The functionalized polymer was therefore dissolved in THF and precipitated into IPA to produce purified functionalized polymers. Table 1 includes the feed rate of copolymer to the extruder, the amount of EDA injected as a percent of the copolymer feed, the percent EDA retained in the extruder product (as $—CHCOOC_2H_5$ including by products retained but not bound to the polymer), the percent by weight of EDA grafted to the polymer, and the grafting efficiency for four extruder grafted samples.

TABLE 1

| Sample | Polymer Feed Rate kg/hr | EDA[1] Feed % wt | Retained[2] EDA % wt | Bound[3] EDA % wt | Efficiency[4] % |
|---|---|---|---|---|---|
| 4A | 6.4 | 2.01 | 1.53 | 0.65 | 32% |
| 4B | 6.4 | 4.01 | 2.95 | 1.58 | 40% |
| 4C | 6.4 | 6.01 | 3.58 | 2.08 | 35% |
| 4D | 8.6 | 1.86 | 1.45 | 0.89 | 48% |

[1]as $—CHCO_2C_2H_5$ based on copolymer feed.
[2]as $—CHCO_2C_2H_5$ in raw extruder product based on copolymer feed
[3]as $—CHCO_2C_2H_5$ in copolymer after dissolution in THF and precipitation in IPA based on copolymer feed
[4]percent of EDA feed which is bound to polymer The relative portion of EDA grafted to styrene blocks and hydrogenated butadiene blocks was determined using $^{13}$C-NMR. Based on integration of peaks characteristic of aliphatic ester species, and $\alpha,\beta$-unsaturated ester species, it was determined that between 20 and 30 percent of the bound EDA was attached to polystyrene segments.

The amount of scissioned and coupled polymer resulting from this functionalization process was determined by measuring the difference between gel permeation chromotography ("GPC") main peak of the base polymer and the functionalized polymer sample, 4C. From this comparison, it was determined that functionalization by grafting EDA results in about 7% by weight decrease in main peak. It was observed that essentially all of this decrease in main was the result of coupling, with a negligible amount of the polymer degraded to lower molecular weight polymers.

This example demonstrates the feasibility of extruder grafting polar functionality to hydrogenated block copolymers of conjugated diolefins and vinyl aromatics using diazo compounds. Additionally, the existence of grafted functional groups in both vinyl aromatic and hydrogenated conjugated diolefin blocks was confirmed.

EXAMPLE 5

Carboxylic acid and lithium salt functionalized copolymers were prepared from portions of Sample 4C of Example 4. A portion of Sample 4C which had been dissolved in THF and then precipitated into IPA was dissolved in toluene. The ester containing polymer was saponified with an excess of potassium hydroxide as a 0.5 molar solution in isobutanol, forming a carboxylate salt. The carboxylate salt was then acidified by contact with an excess of acetic acid. The solution was filtered and then the polymer was precipitated into IPA and the recovered polymer crumb was vacuum dried in an oven. The carboxyl functionality of the resulting polymer was essentially all in the acid form. This sample will be referred to as Sample 5A.

A portion of Sample 5A was then dissolved in the THF and an excess of lithium hydroxide as a solution in water was then added. The copolymer was then precipitated in IPA and water washed until the wash water had a pH of about 7. The carboxyl functionality of the resulting polymer was essentially all in the lithium salt form. This sample will be referred to as Sample 5B.

Mechanical properties were determined for the unfunctionalized base block copolymer, Sample 4C, Sample 5A and Sample 5B. Glass transition temperatures of the hydrogenated polybutadiene phase and the polystyrene phase were determined as the temperatures at which the maximums occured in the tan delta profile using a Rheovibron Dynamic Viscoelastometer. Tensile strength to break was determined at room temperature and 100° C. according to a procedure which approximates ASTM D412, but varies in elongation rate and sample size. The results are included in Table 2.

TABLE 2

| Polymer | Functionality | Tg (°C.) Rubber Phase | Hard Phase | Tensile Strength (psi) RT | Tensile Strength (psi) 100° C. |
|---|---|---|---|---|---|
| Base | None | −42 | 95 | 6400 | 40 |
| 4C | Ester | −40 | 95 | 6200 | 40 |
| 5A | Acid | −37 | 105 | 6800 | 65 |
| 5B | Lithium Salt | −38 | 107 | 6600 | 100 |

From Table 2 it can be seen that the polymer functionalized by grafting the diazo ester functionality and converting the ester functionality to either salt or acid functionality has an unexpected improvement in tensile strength at both room temperature and 100° C. The hard phase glass transition temperature of the acid and salt functionalized polymer are also increased, which reflects an improvement in maximum service temperatures. Further, the hydrogenated polybutadiene phase glass transition temperatures are not significantly increased, which indicates that the elastomeric qualities such as elongation and modulus remain excellent in the functionalized copolymer.

COMPARATIVE EXAMPLE 1

A base block copolymer similar to that used in Examples 1 and 4 was extruder grafted with maleic anhydride in the presence of a free radical initiator according to the functionalization method of the prior art. The extruder barrel temperature was held at about 233° C., and the die temperature was held at about 260° C. Peroxide was injected into the extruder in an amount of 0.25 parts by weight based on 100 parts by weight of base polymer. The peroxide was 2,5-dimethyl-2,5-bis(t-butyl peroxy)hexane which is commercially available from Pennwalt Chemicals under the tradename of LUPERSOL® 101. The maleic anhydride was injected in an amount of about 1.1 parts by weight based on 100 parts by weight of the base copolymer. The resultant polymer contained about 1.0 percent by weight of functionality as maleic anhydride. The functionalized polymer had about 24 percent by weight loss from the GPC main peak compared to the initial polymer, with significant portions of the loss in main peak going to both higher and lower molecular weight polymers.

This demonstrates functionalization by melt grafting a diazo ester results in much lower levels of scissioning, degradation and coupling than the prior art method of melt grafting maleic anhydride.

The tensile strengths at room temperature and 100° C. and the glass transition temperatures of the rubbery and hard phases were determined for the maleic anhydride functionalized polymer and the base polymer. The results are included in Table 3. The data in Table 3 is not directly comparable to that in Table 2 due to slight variations in the base polymer and slight variations in test sample preparation. It can be seen from Table 3 that incorporation of polar functionality onto a polymer by extruder grafting maleic anhydride decreases the tensile strength of the polymer, and does not significantly increase the hard phase glass transition temperature of the polymer.

TABLE 3

| Polymer | Functionality | Tg (°C.) Rubber Phase | Hard Phase | Tensile Strength (psi) RT | 100° C. |
|---|---|---|---|---|---|
| Base | None | −39 | 106 | 6400 | 50 |
| Maleated | Anhydride/Acid | −39 | 108 | 5250 | 30 |

I claim:

1. A process comprising the steps of:

a) providing a melt of a base polymer, the base polymer comprising polymerized monomers selected from the group consisting of, vinyl aromatics, conjugated diolefins, and hydrogenated conjugated diolefins;

b) contacting the melt of the base polymer with a functional group containing diazo compound thereby producing a functionalized polymer; and c) recovering the functionalized polymer.

2. The process of claim 1 wherein the diazo compound functional group is an ester group.

3. The process of claim 1 wherein the diazo compound is an alkyl diazoacetate.

4. The process of claim 1 wherein the diazo compound is ethyl diazoacetate.

5. The process of claim 1 wherein the base polymer comprises conjugated diolefin monomer units.

6. The process of claim 1 wherein the polymer is a hydrogenated conjugated diolefin polymer.

7. The process of claim 1 wherein the base polymer is a radial hydrogenated conjugated diolefin polymer.

8. The process of claim 1 wherein the base polymer is a block copolymer comprising at least one block which comprises predominantly conjugated diolefin monomer units and at least one block which comprises predominantly vinyl aromatic monomer units.

9. The process of claim 8 wherein the block copolymer comprises at least two blocks which comprise predominantly vinyl aromatic monomer units.

10. The process of claim 8 wherein the block copolymer is a hydrogenated block copolymer with at least 80 percent of the initial ethylenic unsaturation eliminated by hydrogenation.

11. The process of claim 9 wherein the block copolymer is a hydrogenated block copolymer with at least 98 percent of the initial ethylenic unsaturation eliminated by hydrogenation.

12. The process of claim 1 wherein the base polymer is contacted with between about one and about 200 moles of the diazo compound per mole of base polymer.

13. The process of claim 1 wherein the base polymer is contacted with between about 5 and about 100 moles of the diazo compound per mole of base polymer.

14. The process of claim 1 wherein the monomer is styrene.

15. The process of claim 1 wherein the monomer is butadiene.

16. The process of claim 1 wherein the monomer is isoprene.

17. The process of claim 9 wherein the base polymer is a poly(conjugated diolefin)-polystyrene-poly(conjugated diolefin) block copolymer.

18. The process of claim 17 wherein the block copolymer is selectively hydrogenated block copolymer with more than 90 percent of the ethylenic unsaturation hydrogenated and 95 percent or more of the aromatic unsaturation remaining.

19. The process of claim 1 wherein the base polymer and the diazo compound are contacted in an extruder.

20. The process of claim 2 further comprising the step of hydrolyzing at least a portion of the ester functionality of the functionalized polymer to form acid functionality.

21. The process of claim 20 further comprising the step of neutralizing at least a portion of the hydrolyzed functionality with a metal ion.

22. The process of claim 1 wherein the base polymer is a solid at room temperature.

23. The process of claim 4 wherein the contacting of the melt of the base polymer and the ethyl diazoacetate is accomplished in an extruder.

24. The process of claim 23 wherein the amount of diazoacetate is between about one mole and about 200 moles per mole of base polymer.

25. The process of claim 24 wherein the base polymer is a hydrogenated radial polyisoprene polymer.

26. The process of claim 23 wherein the base polymer is a hydrogenated polybutadiene.

27. The process of claim 23 wherein the base polymer is a polystyrene.

28. The process of claim 23 wherein the base polymer is a selectively hydrogenated block copolymer comprising at least one block which comprises predominantly conjugated diolefin monomer units and at least one block which comprises predominantly vinyl aromatic monomer units and the hydrogenation as eliminated more than 90 percent of the initial ethylenic unsaturation and less than 5 percent of the initial aromatic unsaturation.

29. The process of claim 28 wherein the vinyl aromatic is styrene.

30. The process of claim 29 wherein the conjugated diolefin is isoprene.

31. The process of claim 29 wherein the conjugated diolefin is butadiene.

32. The process of claim 29 wherein the block copolymer comprises at least two blocks which comprise predominantly styrene monomer units.

33. The process of claim 28 wherein the block copolymer and the alkyl diazoacetate are contacted in the extruder at a temperature between about 150° C. and about 260 ° C. for a time period of between about 5 seconds and about ten minutes.

34. The product of the process of claim 1.

35. The product of the process of claim 28.

* * * * *